(12) United States Patent
Ben-Ezra et al.

(10) Patent No.: US 7,814,051 B2
(45) Date of Patent: Oct. 12, 2010

(54) MANAGING WATCHER INFORMATION IN A DISTRIBUTED SERVER ENVIRONMENT

(75) Inventors: Asaf Ben-Ezra, Acco (IL); Olga Berezin, Yokneam Ilit (IL); Haim Schneider, Ramot Meir (IL); Uri Segev, Or-Yehuda (IL); Ofira Tal-Aviv, Moshav Bitzaron (IL); Asaf Zinger, Givat Shmuel (IL)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 11/971,650

(22) Filed: Jan. 9, 2008

(65) Prior Publication Data

US 2009/0177729 A1 Jul. 9, 2009

(51) Int. Cl.
*G06F 17/00* (2006.01)
(52) U.S. Cl. ............... 707/609; 707/625; 707/687; 707/694; 709/216; 709/219
(58) Field of Classification Search ............... 709/201, 709/202
See application file for complete search history.

(56) References Cited

U.S. PATENT DOCUMENTS

| | | | |
|---|---|---|---|
| 2003/0217142 A1 | 11/2003 | Bobde et al. | |
| 2004/0133641 A1* | 7/2004 | McKinnon et al. | 709/204 |
| 2004/0177134 A1 | 9/2004 | Lonnfors et al. | |
| 2007/0121867 A1* | 5/2007 | Ozugur et al. | 379/201.1 |
| 2007/0182541 A1* | 8/2007 | Harris et al. | 340/506 |
| 2007/0233852 A1* | 10/2007 | Jachner | 709/224 |
| 2008/0016100 A1* | 1/2008 | Boni et al. | 707/102 |
| 2008/0163318 A1* | 7/2008 | Chen et al. | 725/109 |
| 2008/0219425 A1* | 9/2008 | Wang | 379/201.01 |
| 2008/0313321 A1* | 12/2008 | Kiss et al. | 709/223 |
| 2009/0150403 A1* | 6/2009 | Jerome et al. | 707/10 |

FOREIGN PATENT DOCUMENTS

EP 1 699 218 A1 9/2006

OTHER PUBLICATIONS

J. Rosenberg; "A Watcher Information Event Template-Package for the Session Initiation Protocol (SIP)"; RFC 3857 of the Internet Engineering Task Force; Aug. 2004; pp. 1-20.

J. Rosenberg; "An Extensible Markup Language (XML) Based Format for Watcher Information"; RFS 3858 of the Internet Engineering Task Force; Aug. 2004; pp. 1-13.

* cited by examiner

*Primary Examiner*—Nathan Flynn
*Assistant Examiner*—Aftab Nasir Khan
(74) *Attorney, Agent, or Firm*—Sughrue Mion, PLLC (57) ABSTRACT

A system for managing watcher information in a distributed server environment, including a watcher information database configured to store records, any of the records populated by a watcher identifier, a presentity identifier, a list of unique identifiers of a plurality of subscriptions by the watcher, a watcher state field indicating a current state of the watcher, and an event field indicating an event that last caused the state of the watcher to change, each record representing a different pair of a watcher and a presentity pair, and where each of the records maintains a single state for one or more subscriptions by a watcher to receive presence information regarding a presentity, and a plurality of presence servers, where each of the presence servers is configured to modify any of the records to reflect the current state of a watcher for any subscription indicated in the record.

20 Claims, 7 Drawing Sheets

Fig. 7

MANAGING WATCHER INFORMATION IN A DISTRIBUTED SERVER ENVIRONMENT

FIELD OF THE INVENTION

The present invention relates to computer networks in general, and more particularly to providing information to networked entities regarding the status of other networked entities.

BACKGROUND OF THE INVENTION

The Session Initiation Protocol (SIP) is a protocol for creating, modifying, and terminating computer network-based communication sessions, such as for an Internet-based telephone call between two or more participants. Since its introduction numerous enhancements to SIP have been proposed, including the SIP Instant Messaging and Presence Leveraging Extensions (SIMPLE) framework in which one or more network entities, such as computer users, create subscriptions on a server, known as a "presence" server, to receive presence information regarding another network entity, referred to as a "presentity." When a change in the presentity's presence information is detected, such as when the presentity "publishes" such a change to the presence server, SIP is used to send a notification to the subscribers regarding the change.

Further enhancements to SIP, such as those described in RFCs 3857 and 3858 of the Internet Engineering Task Force, provide a mechanism for subscribing to information regarding subscribers to a presentity's presence information. In this context, subscribers to a presentity's presence information are referred to as "watchers," the information regarding these subscribers is referred to as "watcher information," and the subscriber to watcher information is referred to as a "watcher information subscriber." Both presence information and watcher information are preferably maintained in the Extensible Markup Language (XML). The watcher information subscriber may use this information, for example, to detect unauthorized subscriptions for the presentity's presence information.

In a distributed presence server system multiple subscriptions for presence information regarding the same presentity may be handled by more than one presence server simultaneously, such as for the purpose of providing load balancing for SIP messages. Similarly, multiple subscriptions for watcher information for a presentity may be handled by more than one presence server simultaneously, Thus, when a subscription for the presentity's presence information is created or changes its state (e.g., expires) on one presence server, updated watcher information must be sent to all other presence servers that maintain the presentity's watcher information, whereupon the various presence servers may notify the watcher information subscribers of the change. Furthermore, a single subscriber for a presentity's presence information may create multiple subscriptions for the presentity's presence information on multiple servers, such as where one subscription indicates that the presence information be sent to the subscriber's cell phone, and another subscription indicates that the presence information be sent to the subscriber's personal computer. In this scenario, a change in one of the subscriptions does not necessarily mean that the state of the watcher has changed, since the state of other subscriptions by the same subscriber to the same presentity needs to be taken into account. For example, if the subscriber's cell phone subscription expires, but the subscriber's personal computer subscription is still active, the watcher's state is still active, and the watcher information needn't change. Thus, no notification should be sent to watcher information subscribers in this case. If the presence server that manages the cell phone subscription only takes into account the subscriptions that it manages, it would wrongly determine that the watcher's state has changed to "terminated" and would send an incorrect notification to the watcher information subscribers.

Systems and/or methods for sharing and synchronizing watcher information between multiple presence servers that ensures that watcher information subscribers receive correct watcher information would therefore be advantageous.

SUMMARY OF THE INVENTION

The present invention in embodiments thereof discloses novel systems and methods for managing watcher information in a distributed server environment that ensures that watcher information subscribers receive correct watcher information.

In one aspect of the present invention a system is provided for managing watcher information in a distributed server environment, the system including a watcher information database stored on a physical storage device, where the database is configured to store a plurality of records, where any of the records is populated by a watcher identifier, a presentity identifier, a list of unique identifiers of a plurality of subscriptions by the watcher, a watcher state field indicating a current state of the watcher, and an event field indicating an event that last caused the state of the watcher to change, where each of the records represents a different pair of a watcher and a presentity, and where each of the records maintains a single state for one or more subscriptions by a watcher to receive presence information regarding a presentity, and a plurality of presence servers, where each of the presence servers is configured to modify any of the records to reflect the current state of a watcher for any subscription indicated in the record.

BRIEF DESCRIPTION OF THE DRAWINGS

The present invention in embodiments thereof will be understood and appreciated more fully from the following detailed description taken in conjunction with the appended drawings in which.

DETAILED DESCRIPTION OF THE INVENTION

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

Figure 1:
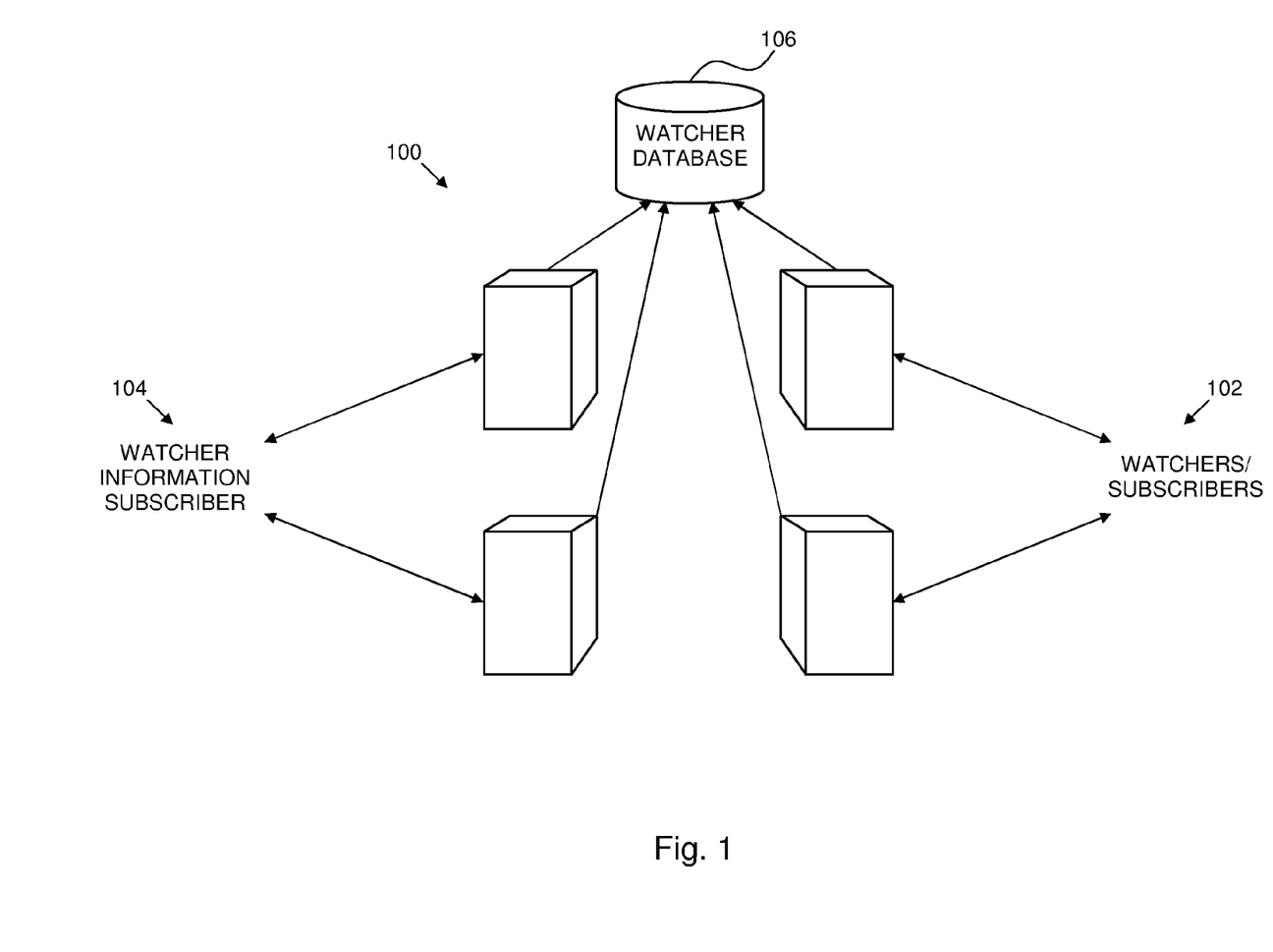
FIG. 1 is a simplified illustration of a system for managing watcher information in a distributed server environment, constructed and operative in accordance with an embodiment of the present invention.

Reference is now made to FIG. 1, which is a simplified illustration of a system for managing watcher information in a distributed server environment, constructed and operative in accordance with an embodiment of the present invention. In the system of FIG. 1, multiple servers 100 are shown, such as being networked computers configured as SIP presence servers. Servers 100 are preferably configured to manage subscriptions for presence information by one or more entities 102, such as SIP presence information subscribers and which are now referred to as watchers 102, and/or provide information regarding such subscriptions to one or more entities 104, now referred to as watcher information subscribers 104. In one embodiment multiple ones of servers 100 each manage one or more subscriptions by one or more watchers 102 for presence information regarding the same presentity, and one or more of these and/or other servers 100 manage one or more subscriptions for watcher information of the same presentity. When a subscription for watcher information of a presentity is first made by watcher information subscriber 104, the server 100 where the subscription is made preferably accesses a watcher database 106, creates a watcher information document identifying all watchers of subscriber 104 and their states and most recent state-changing events, which information is taken from one or more records in watcher database 106 of watcher of the presentity, and sends the watcher information document to watcher information subscriber 104. When a subscription by a watcher 102 is created or changes its state (e.g., expires) on any one of servers 100, the server updates a corresponding record in watcher database 106 and notifies the other servers 100 of the change. Any of servers 100 preferably maintains a list of watcher information subscriptions per presentity known to it. Any of servers 100 receiving such a notification may then notify any of its watcher information subscribers 104 of the change where the change relates to watchers 102 of watcher information subscribers 104.

Figure 2:
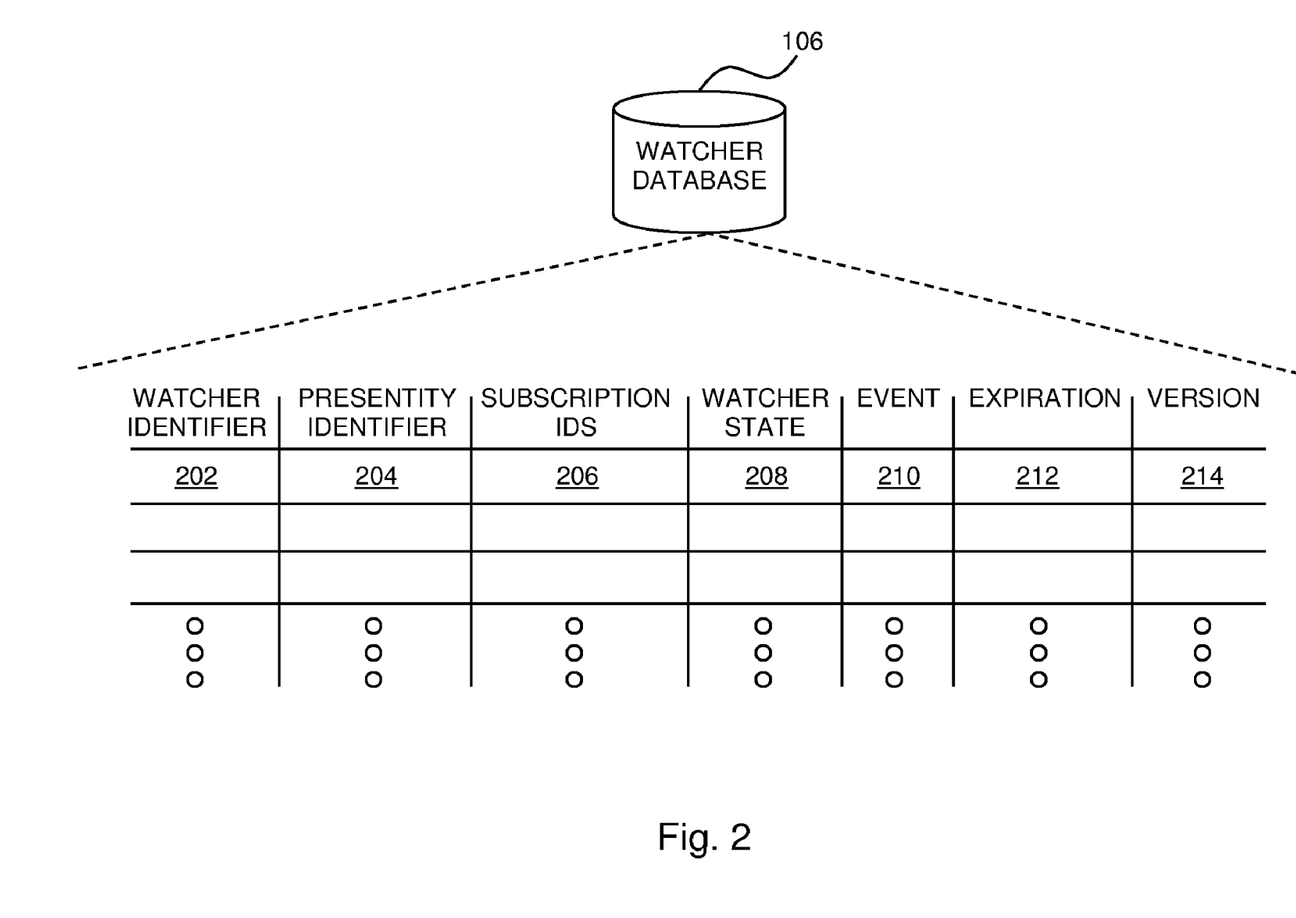
FIG. 2 is a simplified conceptual illustration of watcher database 106, constructed and operative in accordance with an embodiment of the present invention.

Watcher database 106 is, in one embodiment, stored on a physical storage device such as a magnetic memory or other known data storage medium.

Reference is now made to FIG. 2, which is a simplified conceptual illustration of watcher database 106, constructed and operative in accordance with an embodiment of the present invention. Watcher database 106 preferably includes one or more records 200, where each record 200 typically includes the following fields in any order:

- A watcher identifier field 202 identifying one of watchers 102, such as with the watcher's Uniform Resource Identifier (URI);
- A presentity identifier field 204 identifying the presentity to which the watcher 102 indicated in field 202 is subscribed to receive the presentity's presence information; In one embodiment the identifier is a combination of a presentity URI and an event package name. The event package may be a SIP event package, such as the "presence" event package defined in RFC 3856 of the Internet Engineering Task Force. The URI and the event package may be combined into one string identifier by using a separator, such as a comma.
- A subscription ID field 206 populated by a list of unique identifiers of active or pending subscriptions by the watcher 102 identified in watcher URI 202, the subscriptions requesting presence information for the presentity identified in presentity identifier field 204. For example, in SIP/SIMPLE the SIP session ID of each subscription may be used as the unique identifier. If more than one such subscription exists, such as where the watcher creates a subscription for each of multiple client devices, subscription ID field 206 preferably includes the unique identifier of each subscription, each unique identifier being separable from one another through the use of a separator, such as a comma, or by storing each unique identifier using a fixed amount of storage, such as 10 bytes;
- A watcher state field 208 indicating a current state of the watcher 102 identified in watcher URI 202 (e.g., active, terminated, pending, waiting, etc.);
- An event field 210 indicating the event that last caused the state of the watcher 102 identified in watcher URI 202 to change. In one embodiment event field 210 may be populated by any of the events described in Section 3.2.4 of RFC 3265 of the Internet Engineering Task Force;
- An expiration time field 212 indicating the expiration of the current record. In one embodiment expiration time field 212 is set to indicate an expiration time if watcher state field 208 indicates that the current state of the watcher 102 identified in watcher URI 202 is "waiting". In one embodiment the expiration time is set equivalent to the expiration time of the waiting period indicated for a "waiting" subscription as described in RFC 3857 of the Internet Engineering Task Force. The current record is deleted if the current state of the watcher 102 identified in watcher URI 202 is still "waiting" at the end of the expiration period.
- A version field 214 indicating the version of the current record. The version may be represented using a number that is incremented each time the record is changed.

Figure 3:
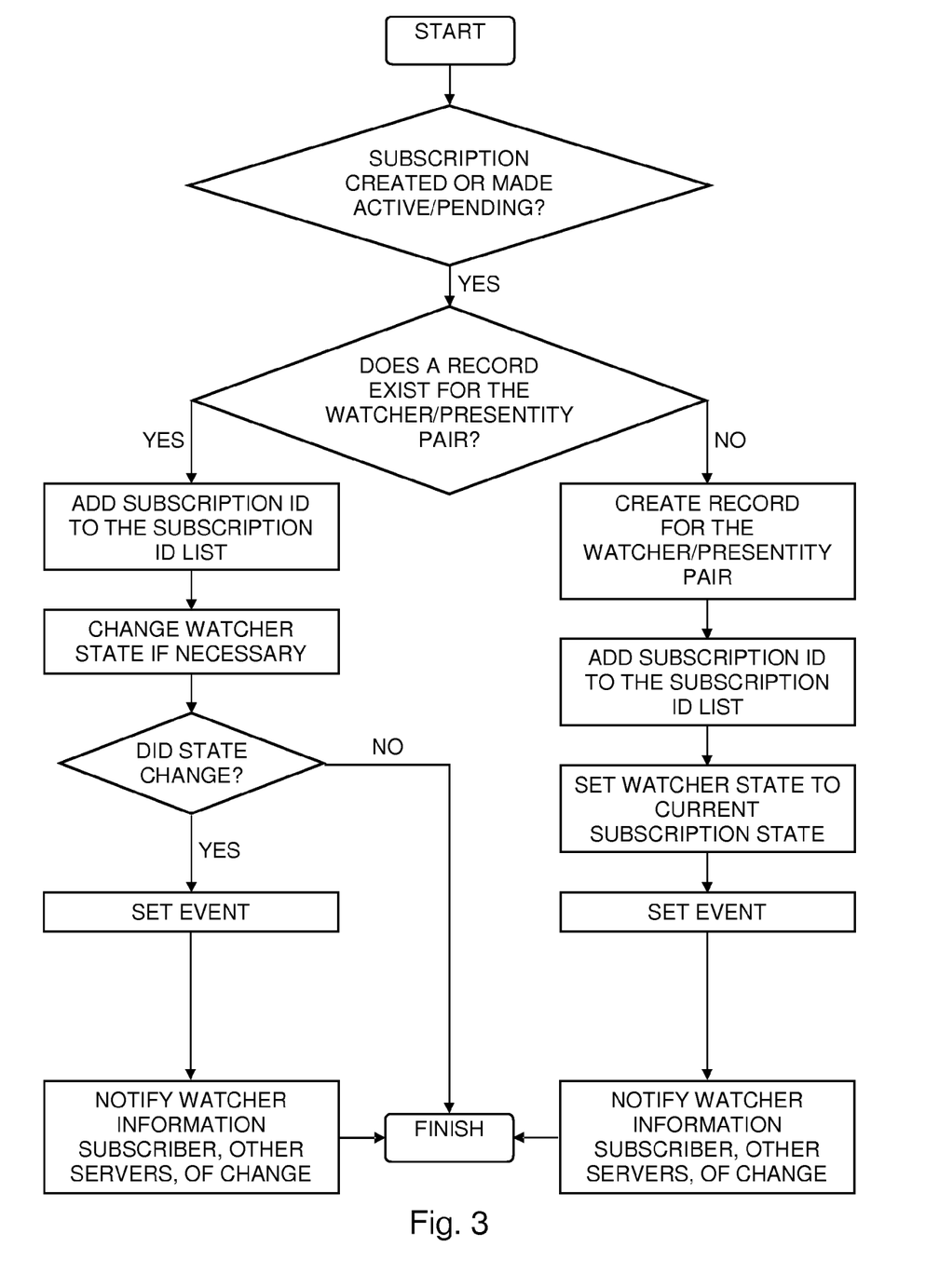
FIG. 3 is a simplified flowchart illustration of a method for managing watcher information in a distributed server environment, operative in accordance with an embodiment of the invention.

Reference is now made to FIG. 3, which is a simplified flowchart illustration of a method for managing watcher information in a distributed server environment, operative in accordance with an embodiment of the invention. In the method of FIG. 3, which is preferably carried out by one or more of servers 100 in the context of the system of FIG. 1, when a subscription is created at a presence server requesting presence information for a presentity, or if the state of an existing subscription changes from "pending" to "active" or vice versa, the server checks if a watcher database record exists for the watcher and the presentity to which the watcher is subscribed. If no record exists, a record is created to record the watcher identifier and the presentity identifier, the subscription ID is added to the subscription ID list, the watcher state is set to the current state of the subscription (e.g., active, pending), and the event field is set to indicate that the event that led to the change in the watcher state (e.g., that the subscription was created). If a record does exist for the watcher and presentity, the subscription ID is added to the subscription ID list. The watcher state is changed to the current state of the subscription only if a change is required. For example, if the watcher state was "waiting" before the current subscription was created, it is changed to "pending" or "active" depending on the state of the just-created subscription. Alternatively, if the state was already "pending" or "active" and the state of the just-created subscription is the same, there is no need to change the state. Alternatively, if the state changes from "active" to "pending", the watcher state is changed to "pending". If the watcher state is changed from what it was before the current subscription was created, the event field is set to indicate the event that led to the change in the watcher. The version is also changed to indicate that the record has been updated.

If the creation of a subscription for presence information of a presentity results in the creation of a watcher and presentity record or changes the watcher state of an existing record, the server preferably sends a notification of the change to the destination(s) indicated by subscription(s) by any watcher information subscriber(s) known to the server for watcher information for the presentity. The server also preferably notifies other servers of the change, such as by using the Java Messaging Service (JMS) publishing mechanism. The content of the notification preferably does not include information regarding all of the watchers of the presentity, but rather only the portion of the watcher information that relates to the watcher regarding which the change occurred, and preferably includes the watcher URI, the watcher information subscriber URI, the event that led to the change, and the version of the watcher/presentity record. Upon receiving such a notification, the receiving server preferably checks if it has watcher information subscriptions for the presentity indicated in the notification and, if so, sends a notification of the change to the destination(s) indicated by the subscription(s) as described above. In this manner a server receiving such a notification does not have to read the watcher information from the database. Only the server on which the change in watcher state occurred needs to access the database.

Figure 4:
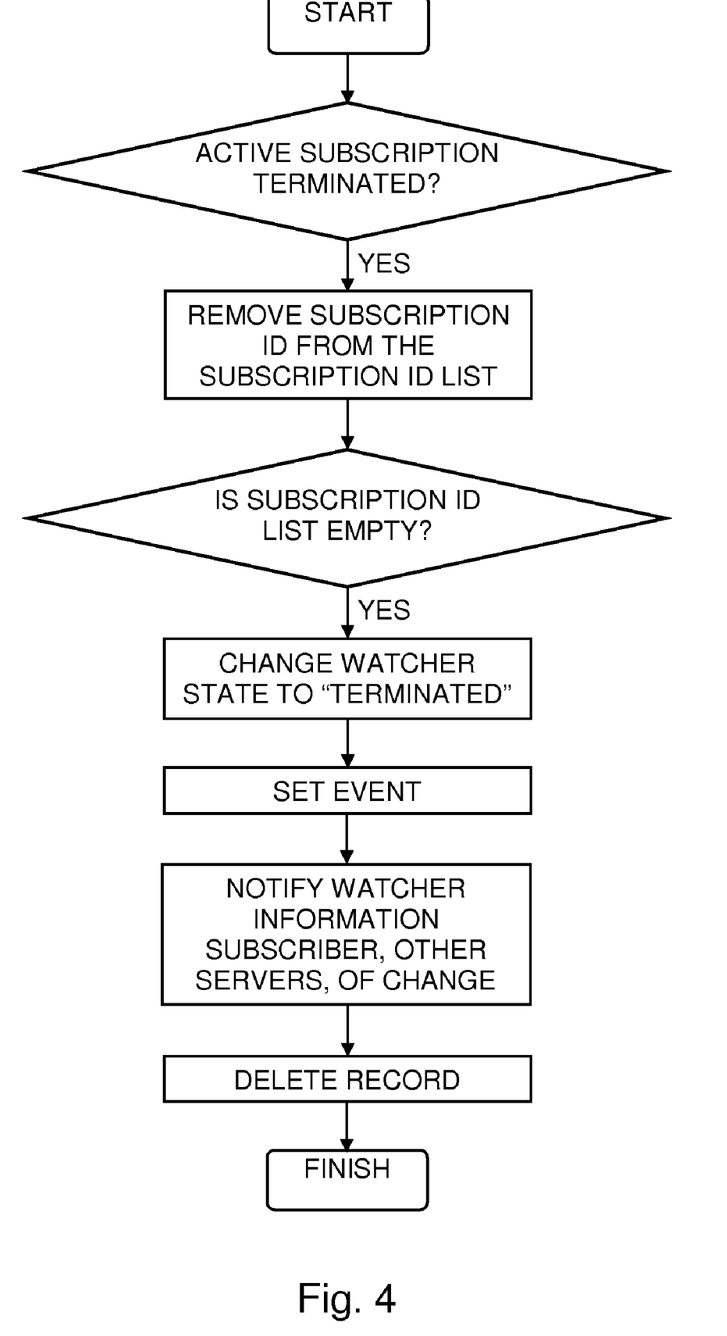
FIG. 4 is a simplified flowchart illustration of a method for managing watcher information in a distributed server environment, operative in accordance with an embodiment of the invention.

Reference is now made to FIG. 4, which is a simplified flowchart illustration of a method for managing watcher information in a distributed server environment, operative in accordance with an embodiment of the invention. In the method of FIG. 4, which is preferably carried out by one or more of servers 100 in the context of the system of FIG. 1, when an active subscription requesting presence information for a presentity is terminated at a presence server, the server accesses the watcher database record for the relevant watcher/presentity pair and removes the subscription ID from the list of subscription IDs. Subsequently, if the subscription ID is empty, the watcher state is set to "terminated," the event is set to indicate the circumstance of the termination (e.g., timeout), and the server preferably sends a notification of the change to the destination(s) indicated by the subscription(s) of the watcher information subscriber known to the server to be monitoring the subscription, as well as to other servers as described hereinabove. The server then preferably deletes the watcher database record.

Figure 5:
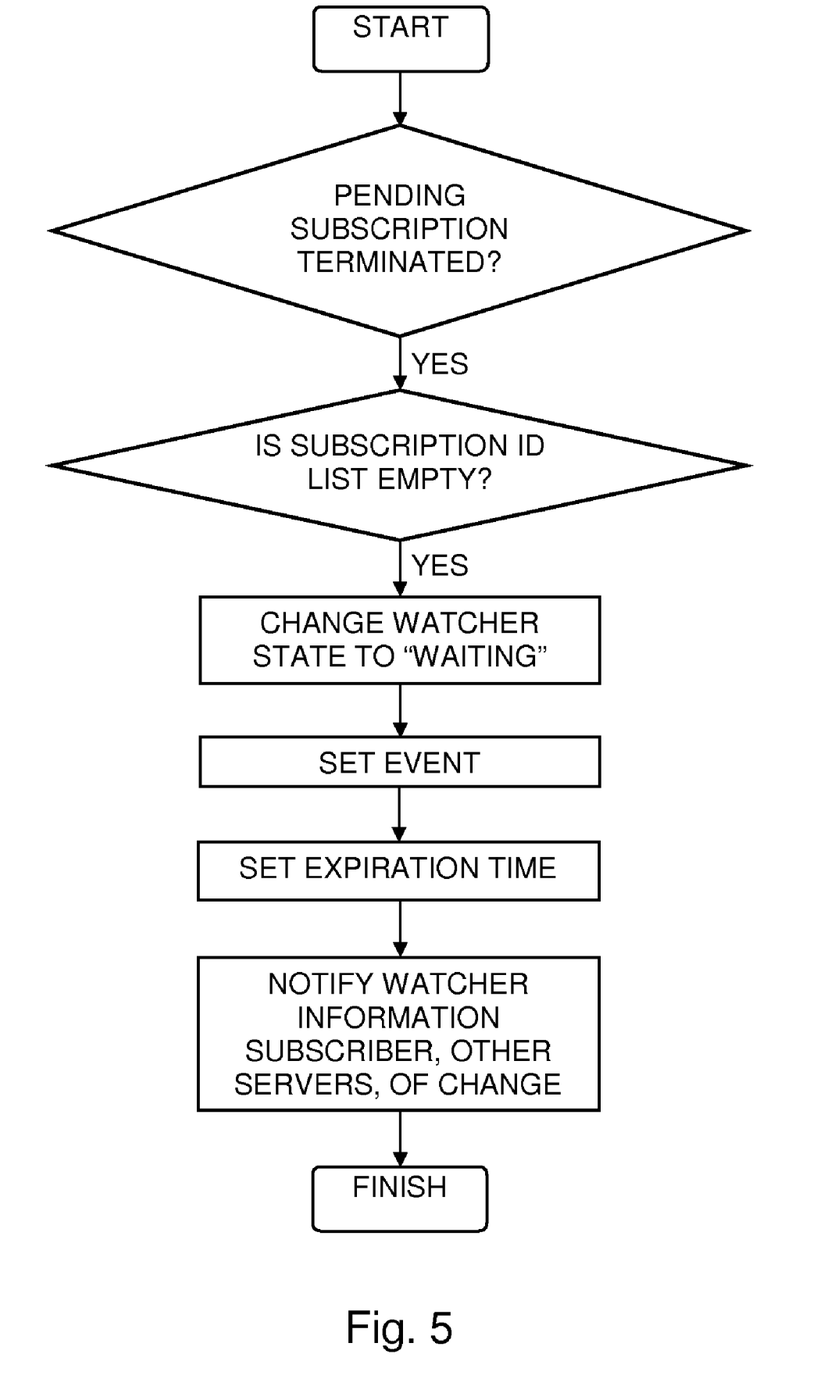
FIG. 5 is a simplified flowchart illustration of a method for managing watcher information in a distributed server environment, operative in accordance with an embodiment of the invention.

Reference is now made to FIG. 5, which is a simplified flowchart illustration of a method for managing watcher information in a distributed server environment, operative in accordance with an embodiment of the invention. In the method of FIG. 5, which is preferably carried out by one or more of servers 100 in the context of the system of FIG. 1, when a pending subscription requesting presence information for a presentity is terminated at a presence server, if the subscription ID is empty, the server changes the subscription state of the watcher/presentity pair record to "waiting" and the event to "timeout", and the expiration time is set to the current time plus a configurable waiting period and send notifications as described above.

Figure 6:
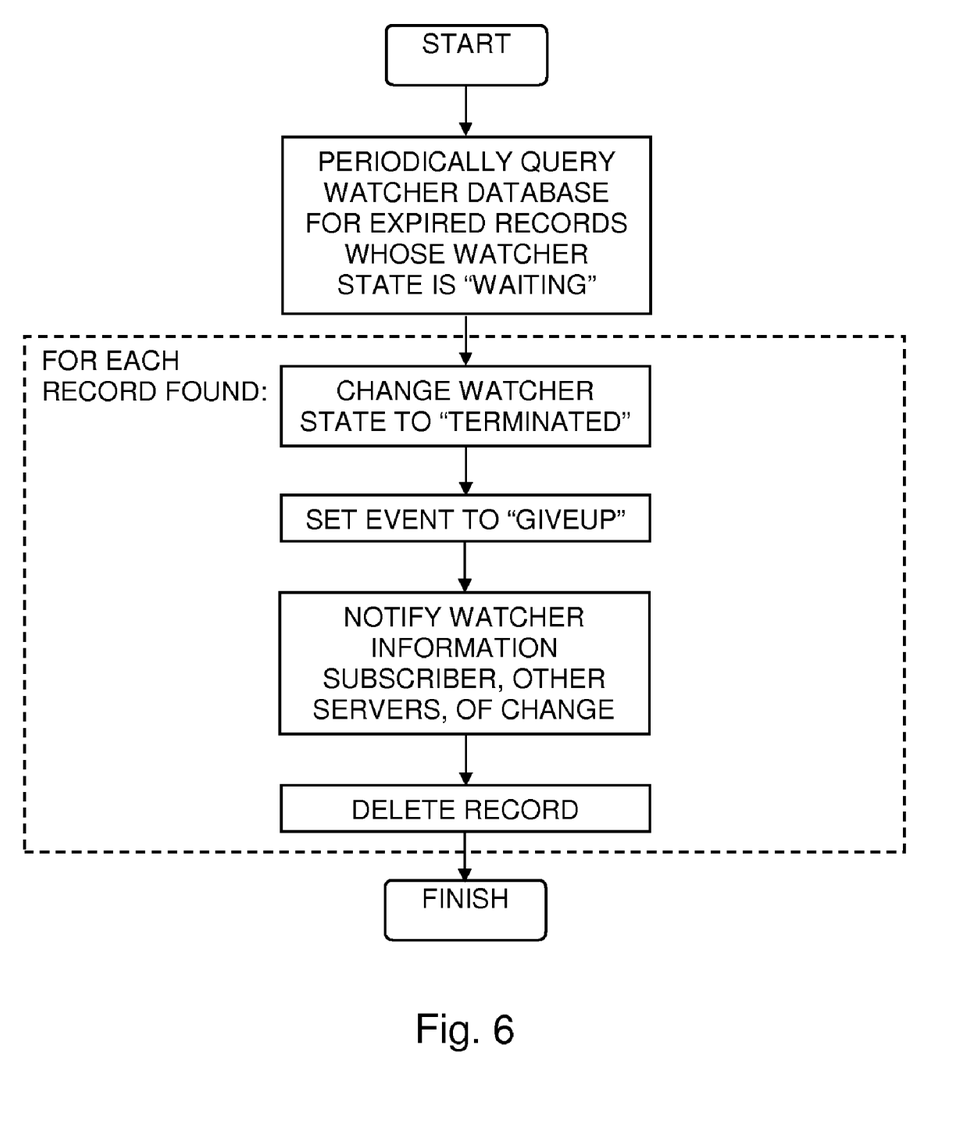
FIG. 6 is a simplified flowchart illustration of a method for managing out-of-order watcher state change messages sent to servers that manage watcher information subscriptions, operative in accordance with an embodiment of the invention.

Reference is now made to FIG. 6, which is a simplified flowchart illustration of a method for managing watcher information in a distributed server environment, operative in accordance with an embodiment of the invention. In the method of FIG. 6, any of the watcher information servers described herein preferably includes a timer that wakes up after configurable intervals and performs a database query to retrieve all watchers whose state is "waiting" and whose expiration period has passed. For every such record found, the watcher state is set to "terminated," the event is set to "giveup", and the server preferably sends a notification of the change to the destination(s) indicated by the subscription(s) of the watcher information subscriber known to the server to be monitoring the watchers of this presentity, as well as to other such servers as described hereinabove. The server then preferably deletes the watcher database record.

Figure 7:
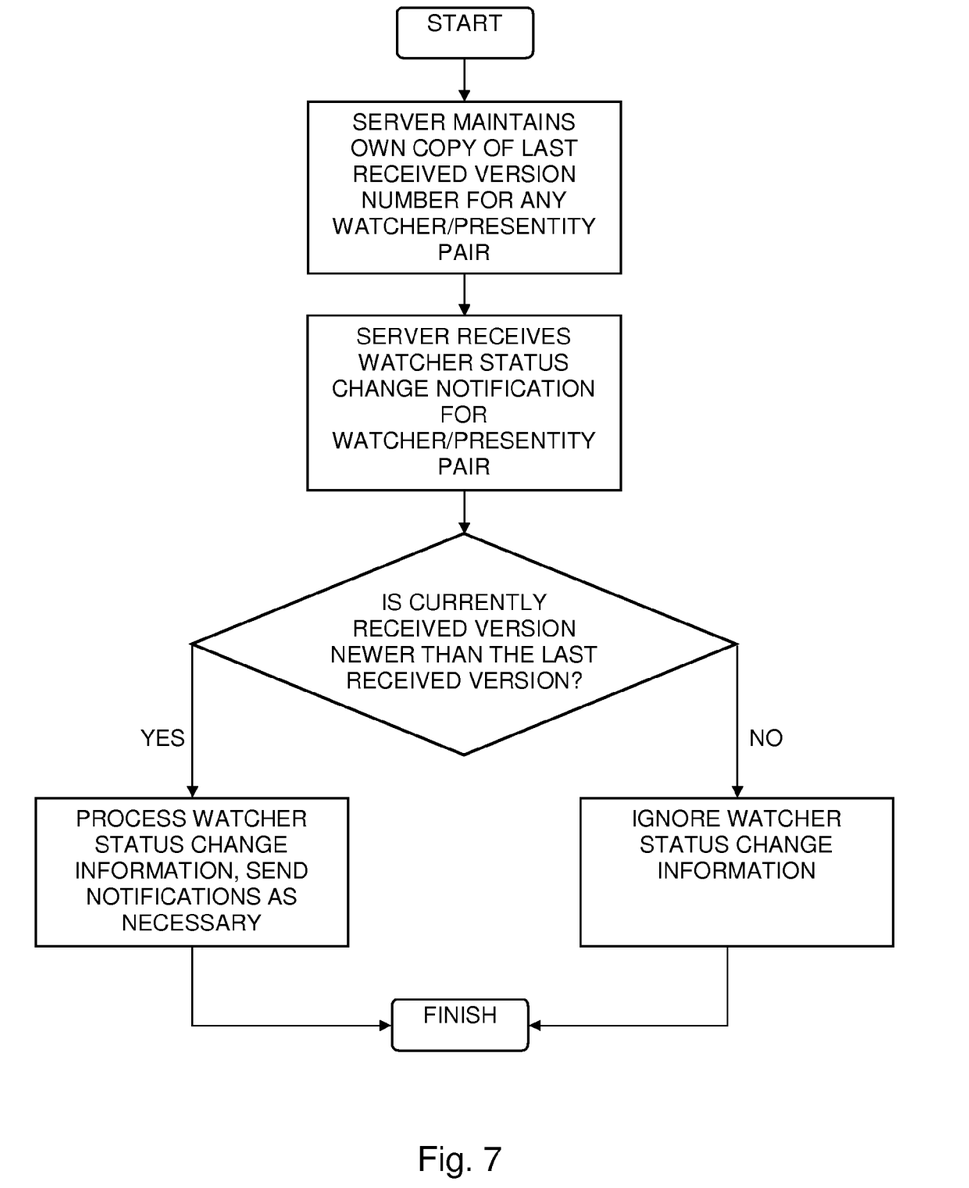
FIG. 7 is a simplified flowchart illustration of a method for managing out-of-order watcher state change messages sent to servers that manage watcher information subscriptions, operative in accordance with an embodiment of the invention.

Reference is now made to FIG. 7, which is a simplified flowchart illustration of a method for managing out-of-order watcher state change messages sent to servers that manage watcher information subscriptions, such as the JMS messages described hereinabove, operative in accordance with an embodiment of the invention. Changes to the state of a watcher may occur at roughly the same time on two different servers. This can happen, for example, when changes occur to two separate subscriptions for the same watcher, such as on his cell phone and personal computer, that are managed by two different servers. Thus, it may happen that the watcher status change messages sent to servers that manage watcher information subscriptions arrive in the wrong order. This may lead to the wrong (old) watcher state being sent to the watcher information subscriber. Thus, in the method of FIG. 7, which is preferably carried out by one or more of servers 100 in the context of the system of FIG. 1, to avoid this problem, each server maintains its own copy of the version indicator it last received for any watcher/presentity pair for presentities for which at least one watcher information subscription exists on the server. When a server receives a watcher status change notification, the server compares the version it last received for the watcher/presentity pair with the version indicated in the notification. If the notification version indicates that it precedes the version it last received for the watcher/presentity, the message is preferably ignored as it contains an old change in watcher information that was already reported to the watcher information subscribers.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

What is claimed is:

1. A system for managing watcher information in a distributed server environment, the system comprising:
   a watcher information database stored on a physical storage device,
   wherein said database is configured to store a plurality of records,
   each of said records is populated by a watcher identifier identifying a watcher, a presentity identifier identifying a corresponding presentity which is an entity to which the identified watcher is subscribed to receive presence information, a list of unique identifiers of a plurality of subscriptions of the watcher for the presence information of the corresponding presentity, a watcher state field indicating a current state of said watcher for each identified subscription, and an event field indicating a most recent event that last caused a state of said watcher to change for each identified subscription, each of said records represents a different pair of the watcher and the presentity, and each of said records maintains a single state for one or more subscriptions by the watcher to receive the presence information regarding the corresponding presentity; and a plurality of presence servers, wherein each of said presence servers is configured to modify any of said records to reflect the current state of the watcher for any subscription indicated in a corresponding record.

2. The system according to claim 1 wherein any of said records is populated by a version field indicating a version of said record.

3. The system according to claim 1, wherein each of said presence servers is configured to modify any of said records to reflect the current state of the watcher for any subscription indicated in said record.

4. The system according to claim 1, further comprising at least one watcher information server configured to maintain at least one subscription by a watcher information subscriber for watcher information for the corresponding presentity, wherein said watcher information server maintains a copy of a version indicator received last for any of said pairs of the watcher and presentity, said watcher information server receives a watcher status change notification for one of said pairs of the watcher and presentity and compares said copy of the version indicator with a version indicator contained in said notification, and said watcher information server is configured to send to said watcher information subscriber a notification of said current state of said watcher if said copy of the version indicator indicates a version precedence over a version indicated by said version indicator contained in the notification.

5. The system according to claim 1, further comprising at least one watcher information server configured to:

maintain at least one subscription by a watcher information subscriber for watcher information for the corresponding presentity, query said watcher information database for the current state of at least one watcher of said corresponding presentity, and send to said watcher information subscriber a notification of said current state of said at least one watcher.

6. The system according to claim 5 wherein any of said presence servers and any of said watcher information servers are embodied as a single server.

7. The system according to claim 1, further comprising at least one watcher information server configured to maintain at least one subscription by a watcher information subscriber for watcher information for the corresponding presentity, wherein said presence servers are operative to send to said watcher information server a notification of a change in the current state of any of said watchers of said corresponding presentity, and said watcher information server is configured to send to said watcher information subscriber a notification of the change in said current state of a respective watcher.

8. The system according to claim 7, wherein any of said presence servers is configured to query said watcher database for any of said records of the respective watchers of said corresponding presentity, create a watcher information document identifying any of said watchers, the current states and the most recent events of the respective identified watchers, and send said watcher information document to any of said watcher information subscribers.

9. The system according to claim 1, wherein any of said records is populated by an expiration time field indicating the expiration time of a respective record.

10. The system according to claim 9, wherein said expiration time field is set to indicate the expiration time if said watcher state field indicates that the current state of the watcher identified in the respective record "waiting".

11. The system according to claim 10, wherein said expiration time field is set to indicate the expiration time that is equivalent to an expiration time of a waiting period indicated for a corresponding "waiting" subscription.

12. A method for managing watcher information in a distributed server environment, the method comprising:

storing a watcher information database on a physical storage device, wherein said database is configured to store a plurality of records, each of said records is populated by a watcher identifier identifying a watcher, a presentity identifier identifying a corresponding presentity which is an entity to which the identified watcher is subscribed to receive presence information, a list of unique identifiers of a plurality of subscriptions of the watcher for the presence information of the corresponding presentity, a watcher state field indicating a current state of said watcher for each identified subscription, and an event field indicating a most recent event that last caused a state of said watcher to change for each identified subscription, each of said records represents a different pair of the watcher and the presentity, and each of said records maintains a single state for one or more subscriptions by the watcher to receive the presence information regarding the corresponding presentity; and modifying any of said records to reflect the current state of the watcher for any subscription indicated in a corresponding record.

13. The method according to claim 12, further comprising:

maintaining at least one subscription by a watcher information subscriber for watcher information for the corresponding presentity;

querying said watcher information database for the current state of at least one watcher of said corresponding presentity; and sending to said watcher information subscriber a notification of said current state of said at least one watcher.

14. The method according to claim 12, further comprising sending a notification of a change in the current state of the watcher identified in any of said records to any server that maintains a watcher information subscription regarding said identified watcher.

15. The method according to claim 12, further comprising:

maintaining at least one subscription by a watcher information subscriber for watcher information for the corresponding presentity, receiving a notification of a change in the current state of any of said watchers of said corresponding presentity; and sending to said watcher information subscriber a notification of said change in the current state of a respective watcher.

16. The method according to claim 15, further comprising:
querying said watcher database for any of said records of the respective watchers of said corresponding presentity;
creating a watcher information document identifying any of said watchers, the current states and the most recent events of the respective identified watchers; and
sending said watcher information document to any of said watcher information subscribers.

17. The method according to claim 12, further comprising setting an expiration time field of any of said records to indicate an expiration time of a respective record.

18. The method according to claim 17, wherein said setting step comprises setting said expiration time field to indicate the expiration time if said record indicates that the current state of the watcher identified by said respective record is "waiting".

19. The method according to claim 18, wherein said setting step comprises setting said expiration time field to indicate the expiration time that is equivalent to an expiration time of a waiting period indicated for a corresponding "waiting" subscription of a watcher identified by said respective record.

20. A non-transient computer-readable medium storing a computer program which, when executed by a computer, causes the computer to perform a method comprising:
storing a watcher information database on a physical storage device,
wherein said database is configured to store a plurality of records,
each of said records is populated by a watcher identifier identifying a watcher, a presentity identifier identifying a corresponding presentity which is an entity to which the identified watcher is subscribed to receive presence information, a list of unique identifiers of a plurality of subscriptions of the watcher for the presence information of the corresponding presentity, a watcher state field indicating a current state of said watcher for each identified subscription, and an event field indicating an event that last caused a state of said watcher to change for each identified subscription,
each of said records represents a different pair of the watcher and the presentity, and
each of said records maintains a single state for one or more subscriptions by the watcher to receive the presence information regarding the corresponding presentity; and
modifying any of said records to reflect the current state of the watcher for any subscription indicated in a corresponding record.

* * * * *